No. 743,515. PATENTED NOV. 10, 1903.
C. J. JONES.
DRAFT EQUALIZER.
APPLICATION FILED JULY 16, 1903.
NO MODEL.
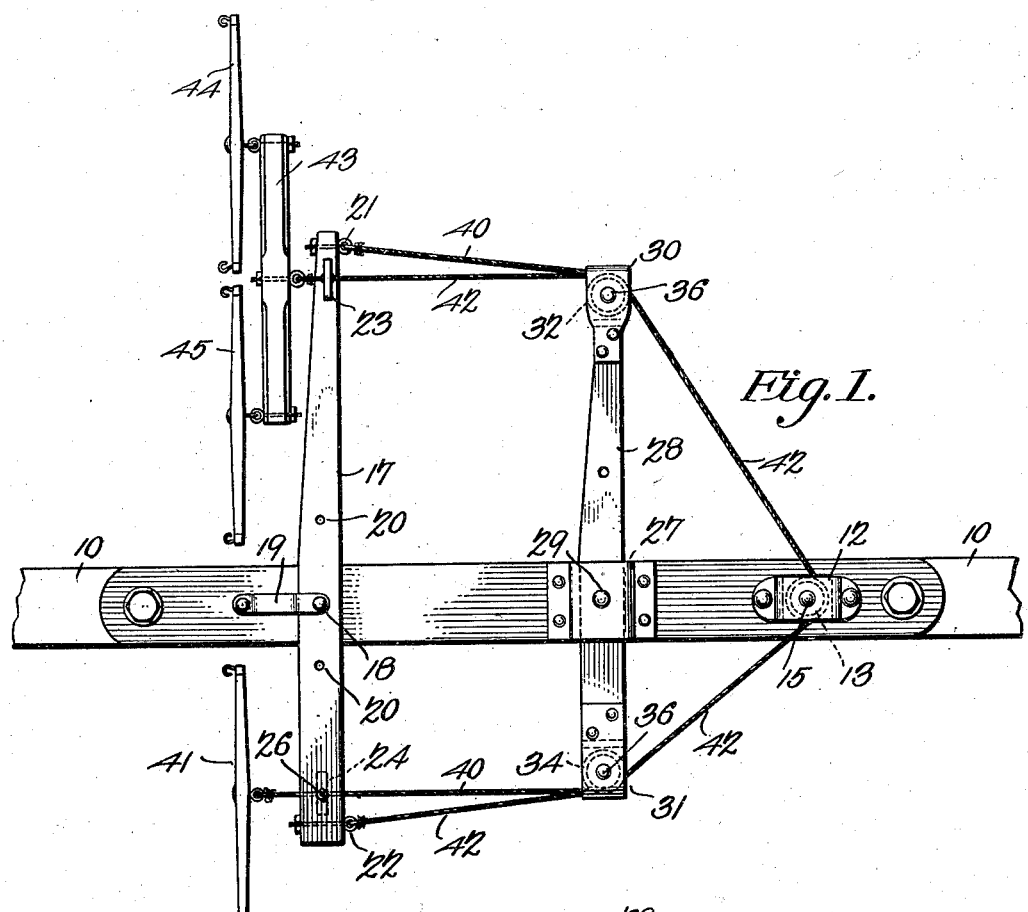
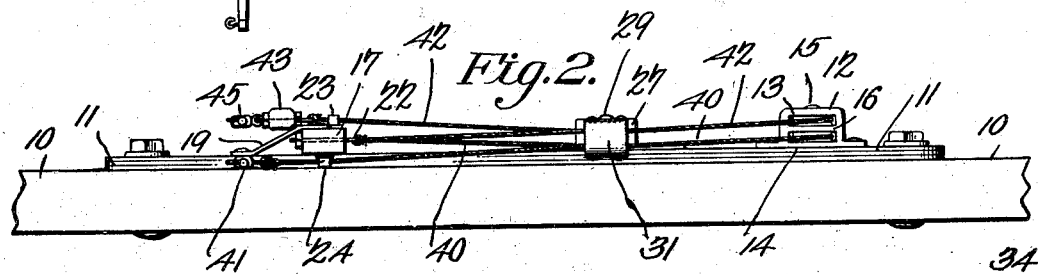
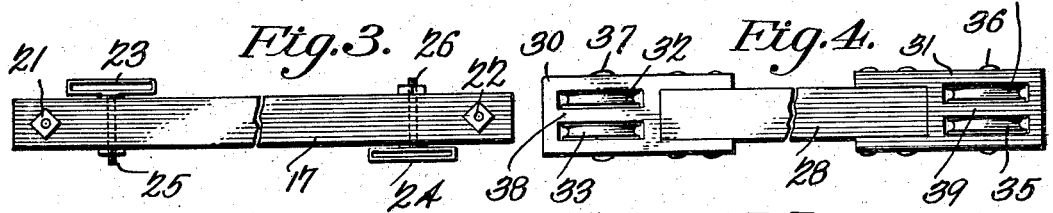
Witnesses
E. F. Stewart
C. H. Woodward
Charles J. Jones, Inventor.
by C. A. Snow & Co.
Attorneys No. 743,515. Patented November 10, 1903.

UNITED STATES PATENT OFFICE.

CHARLES J. JONES, OF YELLOWSTONE PARK, WYOMING.

DRAFT-EQUALIZER.

SPECIFICATION forming part of Letters Patent No. 743,515, dated November 10, 1903.

Application filed July 16, 1903. Serial No. 165,798. (No model.)

*To all whom it may concern:*

Be it known that I, CHARLES J. JONES, a citizen of the United States, residing at Yellowstone Park, in National Park Reservation, State of Wyoming, have invented a new and useful Draft-Equalizer, of which the following is a specification.

This invention relates to draft-equalizers employed upon plows, harvesting machinery, harrows, and the like wherein three or more horses are employed operating abreast and with a plurality of the horses upon one side of the line of draft, and has for its object to simplify and improve devices of this character, to cheapen the construction, and equalize the draft more effectually without adding to the complication of the apparatus.

The invention consists in certain novel features of construction, as hereinafter shown and described, and specified in the claims.

In the drawings illustrative of the invention, in which corresponding parts are denoted by like designating characters, Figure 1 is a plan view of the device. Fig. 2 is a side elevation. Fig. 3 is a front elevation of the evener-bar, enlarged. Fig. 4 is a front elevation, enlarged, of the spacer-bar.

The improved device may be attached to any of the various forms of draft appliances—such as tongues, draft-beams, and the like—but for the purpose of illustration is shown applied to a section of a draft-tongue 10—such as are used, for instance, upon gang or sulky plows—to which the device is more particularly applicable; but it may be used upon any vehicle or machine to which it is adapted.

The improved device comprises a base-plate 11, attached, as by bolts, to the tongue 10 and provided with a keeper 12 at one end, in which guide-pulleys 13 14 are mounted for rotation, preferably upon the same stud or pin 15, the keeper preferably provided with a parting-plate 16 to keep the chains or cables from interfering, as hereinafter described.

An evener-bar 17 is movably connected, as by pin 18 and keeper 19, near the forward end of the plate 11 and provided with a plurality of apertures, as at 20, so that the "leverage" can be changed to adapt the device to three or more horses or to horses of different strength.

Attached to the ends of the evener-bar are draft-eyes 21 22, and also connected to the evener-bar are elongated loops 23 24, having studs 25 26, extending centrally therefrom and through the evener-beam and secured by nuts or by riveting, the loop at the long end being disposed above the beam and the loop at the short end being disposed below the beam, as shown, the object to be hereinafter explained. The loops are thus free to swing upon their studs.

The longer arm of the evener will be tapered to equalize the weight, as shown, so that the evener will "balance" on the tongue.

Intermediately of the plate 11 a housing or keeper 27 is secured, providing means for rigidly supporting a spacer-bar 28, as by bolts 29.

The ends of the bar 28 are respectively provided with frames 30 31, in which guide-pulleys 32 33 and 34 35 are journaled, as shown, by pins 36 37, the frames being divided by plate 38 39, so that each pulley rotates its own pocket, and thus prevents the chains or cables from interfering, as hereinafter shown.

Connected to the draft-eye 21 is a flexible draft medium, such as a cable or chain 40, leading thence around one of the guide-pulleys 13 14, preferably by the way of one of the guide-pulleys 32 or 33, and thence through the loop 24 on the short end of the evener and connected to a swingletree 41 in advance of the evener-bar, as shown. Connected to the draft-eye 22 is another flexible draft medium, such as cable or chain 40, passing thence around the other guide-pulley 13 14, preferably by the way of the other of the guide-pulleys 34 or 35 on the spacer-beam, and thence through the loop 23 on the longer end of the evener-beam, preferably by the way of the other of the guide-pulleys 32 or 33 in the spacer-beam, and connected to a doubletree 43 in advance of the longer end of the evener-beam, as shown, the doubletree having the usual swingletrees 44 45. By this means the single horse pulls upon the long end of the evener-beam and the team of horses pull upon the short end of the evener-beam, the single horse thus pulling against the draft of the team upon the short end of the evener-beam, and thus effectually equalizing the strains and eliminating all side draft. Then by adjusting the evener-beam by means of the apertures 20 any variation in the strength of the animals can be corrected and the equality of the draft maintained. The plurality of apertures 20 likewise enables the device to be adapted to any number of draft-animals and for arranging them in any desired relative manner.

The arranging of the loops 23 24 whereby the swingletree 41 is connected at a lower point than the doubletree 43 on the other side of the line of draft is of special importance and advantage when the device is employed upon plows, as the single horse walking in the furrow below the "land" on which the other horses walk is hitched at a correspondingly lower point without twisting or wrenching the parts or requiring any additional expense or weight, as the difference is accomplished by merely reversing the positions of the loops.

The loops are so arranged as to permit of ready reversal when necessary, and bar 28 is provided with a number of openings for the passage of the bolt 29 to accommodate different positions of adjustment. This is an important feature of the invention and adds materially to its value and efficiency, especially when operating with plows.

The device may also be used on plows without tongues by attaching the supporting-plate thereto by clevises or similar securing means.

The whole device is simple and inexpensive and can be applied to all the various forms of agricultural implements employing a plurality of draft-animals working abreast.

Having thus described my invention, what I claim is—

1. In a draft-equalizer, a draft medium, an evener-bar movably connected to said draft medium, guide-pulleys upon said draft medium in the rear of said evener-bar, a flexible draft medium connected to the short end of said evener-bar and carried thence around one of said guide-pulleys and connected to a doubletree at the longer end of said evener-bar, and a flexible draft medium connected to the longer end of said evener-bar and carried thence around one of said guide-pulleys and connected to a swingletree at the shorter end of said evener-bar, substantially as described.

2. In a draft-equalizer, a draft medium, an evener-bar movably connected to said draft medium and provided with guide-loops at the ends, guide-pulleys disposed in the rear of said evener-bar, a flexible draft medium connected to the short end of said evener-bar and carried thence around one of said guide-pulleys and through the loop at the longer end of said evener-bar and connected to a doubletree, and a flexible draft medium connected to the longer end of said evener-bar and carried thence around one of said guide-pulleys and through the loop upon the shorter end of said evener-bar and connected to a swingletree, substantially as described.

3. In a draft-equalizer for plows and the like, an evener-beam connected movably to the draft medium, an elongated loop connected to swing beneath said evener-bar at one end, an elongated loop connected to swing above said evener-beam at the other end, guide-pulleys disposed upon said draft medium in the rear of said evener-bar, a flexible draft medium connected to the short end of said evener-bar and carried thence around one of said guide-pulleys and through the loop above the long end of said evener-bar and connected to a doubletree, and a flexible draft medium connected to the longer end of said guide-pulleys and thence through the loop beneath the short end of said evener-bar and connected to a swingletree, substantially as described.

4. In a draft-equalizer, a draft medium, an evener-bar movably connected to said draft medium, guide-pulleys upon said draft medium in the rear of said evener-bar, a spreader-bar carrying guide-pulleys at its ends and connected transversely of said draft medium between said guide-pulleys and evener-bar, a flexible draft medium between said guide-pulleys and evener-bar, a flexible draft medium connected to the longer end of said evener-bar and carried thence over one of the guide-pulleys on one end of said spreader-bar and thence around one of the guide-pulleys on said draft medium and thence around one of the guide-pulleys on the other end of said spreader-bar and connected to a swingletree spaced in front of the shorter end of said evener-bar, and a flexible draft medium connected by one end to the shorter end of said evener-bar and carried thence over one of the guide-pulleys on one end of said spacer-bar and thence around one of the guide-pulleys on said draft medium and thence around one of the guide-pulleys on the other end of said spacer-bar, and connected to a doubletree spaced in front of the longer end of said evener-bar, substantially as described.

5. In a draft-equalizer, a draft medium, an evener-bar movably connected to said draft medium, guide-pulleys upon said draft medium in the rear of said evener-bar, a spreader-bar carrying guide-pulleys at its ends and connected transversely of said draft medium between said guide-pulleys and evener-bar, a flexible draft medium connected to the longer end of said evener-bar and carried thence around one of the guide-pulleys on said draft medium, and thence around one of the guide-pulleys on one end of said spreader-bar and connected to a swingletree spaced in front of said evener-bar, and a flexible draft medium connected to the short end of said evener-bar and carried thence around one of the guide-pulleys on said draft medium and thence around one of the guide-pulleys on the other end of said spreader-bar and connected to a doubletree spaced in front of said evener substantially as described.

6. In a draft-equalizer, a draft-tongue, a base-plate disposed longitudinally on said tongue, spaced guide-pulleys mounted for rotation at one end of said plate, an evener-bar movably connected at the opposite end of said plate, a spacer-bar connected rigidly to said tongue intermediately of said plate and carrying guide-pulleys at the ends, a flexible draft medium connected to the longer end of said evener-bar and carried thence over one of the guide-pulleys on said plate and thence around one of the guide-pulleys on one end of said spacer-bar and connected to a swingletree spaced in front of said evener-bar, and a flexible draft medium connected to the shorter end of said evener-bar and carried thence around one of the guide-pulleys on said tongue and thence around one of the guide-pulleys on the opposite end of said spacer-bar and connected to a doubletree spaced in front of said evener-bar, substantially as described.

7. In a draft-equalizer, a draft-tongue, a base-plate mounted longitudinally on said tongue, spaced guide-pulleys mounted for rotation at one end of said plate, an evener-bar movably connected at the opposite end of said plate, a keeper upon said plate between said guide-pulleys and evener-bar, a spacer-bar rigidly connected in said keeper and having guide-pulleys in its ends, a flexible draft medium connected to the longer end of said evener-bar and carried thence over one of the guide-pulleys on said plate and thence around one of the guide-pulleys on one end of said spacer-bar and connected to a swingletree spaced in front of said evener-bar and a flexible draft medium connected to the shorter end of said evener-bar and carried thence around one of the guide-pulleys on said tongue and thence around one of the guide-pulleys on the opposite end of said spacer-bar and connected to a doubletree spaced in front of said evener-bar, substantially as described.

In testimony that I claim the foregoing as my own I have hereto affixed my signature in the presence of two witnesses.

CHARLES J. JONES.

Witnesses:
CHESTER A. LINDSLEY,
EDWARD MASON.